(12) United States Patent
Thiele et al.

(10) Patent No.: US 11,984,763 B2
(45) Date of Patent: May 14, 2024

(54) ELECTRIC MACHINES HAVING A RADIALLY EMBEDDED PERMANENT MAGNET ROTOR AND METHODS THEREOF

(71) Applicants: Regal Beloit America, Inc., Beloit, WI (US); Regal Beloit Australia Pty Ltd, Rowville (AU)

(72) Inventors: Mark Thiele, Cape Woolamai (AU); Greg Heins, Rowville (AU); Subhash Brahmavar, Fort Wayne, IN (US); Steve Long, Fort Wayne, IN (US); Lester Benjamin Manz, Paulding, OH (US); Kerry Shelton, Fort Wayne, IN (US)

(73) Assignees: Regal Beloit America, Inc., Beloit, WI (US); Regal Beloit Australia Pty Ltd, Rowville (AU)

( * ) Notice: Subject to any disclaimer, the term of this patent is extended or adjusted under 35 U.S.C. 154(b) by 701 days.

(21) Appl. No.: 16/816,335

(22) Filed: Mar. 12, 2020

(65) Prior Publication Data

US 2021/0288532 A1   Sep. 16, 2021

(51) Int. Cl.
*H02K 1/27* (2022.01)
*H02K 1/14* (2006.01)
*H02K 1/276* (2022.01)
*H02K 15/03* (2006.01)
*H02K 21/16* (2006.01)

(52) U.S. Cl.
CPC .............. *H02K 1/276* (2013.01); *H02K 1/146* (2013.01); *H02K 15/03* (2013.01); *H02K 21/16* (2013.01); *H02K 2201/03* (2013.01)

(58) Field of Classification Search
CPC ...... H02K 1/2773; H02K 1/276; H02K 1/146; H02K 21/16; H02K 15/03; H02K 29/03; H02K 2213/03; H02K 2201/03
USPC ..................................................... 310/156.53
See application file for complete search history.

(56) References Cited

U.S. PATENT DOCUMENTS

| 3,979,821 A | 9/1976 | Noodleman |
| 5,786,650 A * | 7/1998 | Uchida ................. H02K 15/03 310/156.55 |
| 5,829,120 A * | 11/1998 | Uchida ................. H02K 15/03 29/598 |
| 5,886,441 A * | 3/1999 | Uchida ................ H02K 1/2773 310/264 |

(Continued)

*Primary Examiner* — Alex W Mok
(74) *Attorney, Agent, or Firm* — Armstrong Teasdale LLP (57) ABSTRACT

A permanent magnet rotor core includes a plurality of rotor poles circumferentially-spaced about a central axis and including a first rotor pole and an adjacent second rotor pole that each include an outer wall, and wherein the rotor core includes a rotor diameter. The rotor core also includes a plurality of radial apertures alternately-spaced with the plurality of rotor poles. The rotor core also includes a first protrusion extending from the first rotor pole into a first radial aperture of the plurality of radial apertures positioned between the first rotor pole and the second rotor pole. The rotor core further includes a second protrusion extending from the second rotor pole into the first radial aperture such that a circumferential opening is defined between the first protrusion and the second protrusion. The opening extends a first length of between approximately 0.052% and approximately 0.058% of the rotor diameter.

5 Claims, 6 Drawing Sheets

(56) References Cited

U.S. PATENT DOCUMENTS

| | | | |
|---|---|---|---|
| 5,889,346 A * | 3/1999 | Uchida | H02K 15/03 |
| | | | 310/268 |
| 5,939,810 A * | 8/1999 | Uchida | H02K 1/2773 |
| | | | 310/216.116 |
| 6,392,324 B1 * | 5/2002 | Kuwahara | H02K 1/30 |
| | | | 310/268 |
| 8,704,472 B2 | 4/2014 | Nashiki | |
| 9,048,712 B2 * | 6/2015 | Lee | H02K 1/28 |
| 9,099,905 B2 * | 8/2015 | Manz | H02K 1/274 |
| 9,246,364 B2 * | 1/2016 | Brahmavar | H02K 3/02 |
| 9,331,532 B2 * | 5/2016 | Zhang | H02K 21/024 |
| 9,362,792 B2 * | 6/2016 | Figgins | H02K 21/16 |
| 9,419,482 B2 * | 8/2016 | Lee | H02K 1/28 |
| 9,531,220 B2 * | 12/2016 | Kim | H02K 1/2773 |
| 9,692,266 B2 * | 6/2017 | Nehl | H02K 1/2766 |
| 9,712,007 B2 * | 7/2017 | Tanaka | H02K 1/2773 |
| 9,716,411 B2 * | 7/2017 | Tanaka | H02K 1/2766 |
| 9,748,807 B2 | 8/2017 | Pan et al. | |
| 9,831,727 B2 * | 11/2017 | Brahmavar | H02K 15/00 |
| 9,882,440 B2 * | 1/2018 | Kingrey | H02K 21/16 |
| 9,923,423 B2 * | 3/2018 | Brahmavar | H02K 3/02 |
| 2004/0245881 A1 | 12/2004 | Kadoya et al. | |
| 2012/0267972 A1 * | 10/2012 | Leung | H02K 5/15 |
| | | | 310/90 |
| 2015/0244218 A1 * | 8/2015 | Kaufmann | H02K 1/28 |
| | | | 310/156.58 |
| 2018/0069443 A1 * | 3/2018 | Han | H02K 1/28 |
| 2018/0183288 A1 * | 6/2018 | Brahmavar | H02K 1/2773 |

* cited by examiner

ELECTRIC MACHINES HAVING A RADIALLY EMBEDDED PERMANENT MAGNET ROTOR AND METHODS THEREOF

BACKGROUND

The field of the disclosure relates generally to electric motors, and more particularly, to radially embedded permanent magnet rotors and methods of reducing noise during operation.

Radial flux electric machines include permanent magnets positioned within a rotor core, commonly referred to as an interior permanent magnet rotor. Slots are formed within the rotor, and magnets are inserted into the slots. The magnet slots must be larger than the magnets to allow the magnets to be inserted. However, the magnets must be secured within the slots to prevent movement of the magnets during operation of the machine. The performance of the machine depends on maintaining the magnets in a known position within the rotor. An adhesive may be used to secure the magnets in a fixed position relative to the rotor.

Many known rotor cores include a plurality of poles in a symmetrical configuration and are formed from multiple laminations stacked on top of one another. Each lamination generally includes an opening aligned with an adjacent lamination opening to form the magnet opening. During manufacturing, one or more poles may move relative to the remainder of the poles and cause the rotor core to lose symmetry. Pole to pole dissymmetry may result in undesirable noise during operation of the electric machine.

In permanent magnet ECM of spoked rotor construction the non-continuous rotor profile that is made up of magnets & rotor poles results in objectionable noise due cogging torque harmonics when the motor is starting, coasting down, operating at speed that correspond to a sympathetic structural resonance. In some applications, cogging torque produces objectionable vibration of the motor shaft resulting in end product noise. Furthermore, cogging torque may produce undesirable stator torsional and/or radial forces.

BRIEF DESCRIPTION

In one embodiment, a permanent magnet rotor core is provided. The permanent magnet rotor core includes a plurality of rotor poles circumferentially-spaced about a central axis, wherein the plurality of rotor poles include a first rotor pole and an adjacent second rotor pole that each include an outer wall, and wherein the rotor core includes a rotor diameter. The rotor core also includes a plurality of radial apertures alternately-spaced with the plurality of rotor poles, wherein each radial aperture is configured to receive at least one permanent magnet therein. The rotor core also includes a first protrusion extending from the first rotor pole into a first radial aperture of the plurality of radial apertures positioned between the first rotor pole and the second rotor pole. The rotor core further includes a second protrusion extending from the second rotor pole into the first radial aperture such that a circumferential opening is defined between the first protrusion and the second protrusion. The opening extends a first length of between approximately 0.052% and approximately 0.058% of the rotor diameter.

In another embodiment, a permanent magnet rotor core for use in an electric motor that includes a stator core is provided. The permanent magnet rotor core includes a plurality of rotor poles circumferentially-spaced about a central axis, wherein the plurality of rotor poles comprise an outer periphery of the rotor core. A plurality of radial apertures are alternately-spaced with the plurality of rotor poles, wherein each radial aperture is configured to receive at least one permanent magnet therein. The rotor core also includes a plurality of bridges, wherein each bridge extends across a radial aperture of the plurality of radial apertures and between adjacent rotor poles of the plurality of rotor poles. The rotor core further includes a plurality of dummy slots formed in the outer periphery of said rotor core, wherein each dummy slot is positioned between adjacent rotor poles of the plurality of rotor poles.

In yet another embodiment, a permanent magnet rotor core is provided. The rotor core includes a plurality of stacked laminations, wherein each lamination includes a plurality of rotor poles circumferentially-spaced about a central axis, wherein the plurality of rotor poles includes a first rotor pole and an adjacent second rotor pole that each includes an outer wall. Each lamination further includes a plurality of radial apertures alternately-spaced with the plurality of rotor poles, wherein the radial aperture is configured to receive at least one permanent magnet therein. Each rotor pole includes a pair of protrusions extending circumferentially outward into adjacent radial apertures of the plurality of radial apertures. Each lamination also includes a plurality of circumferentially-spaced openings defined between protrusions of adjacent rotor poles that extend into a shared radial aperture of the plurality of radial aperture and a bridge member positioned within at least one opening of the plurality of openings. Each lamination of the plurality of laminations is rotated by a predetermined angle with respect to a preceding lamination of the plurality of laminations.

DETAILED DESCRIPTION

Figure 1:
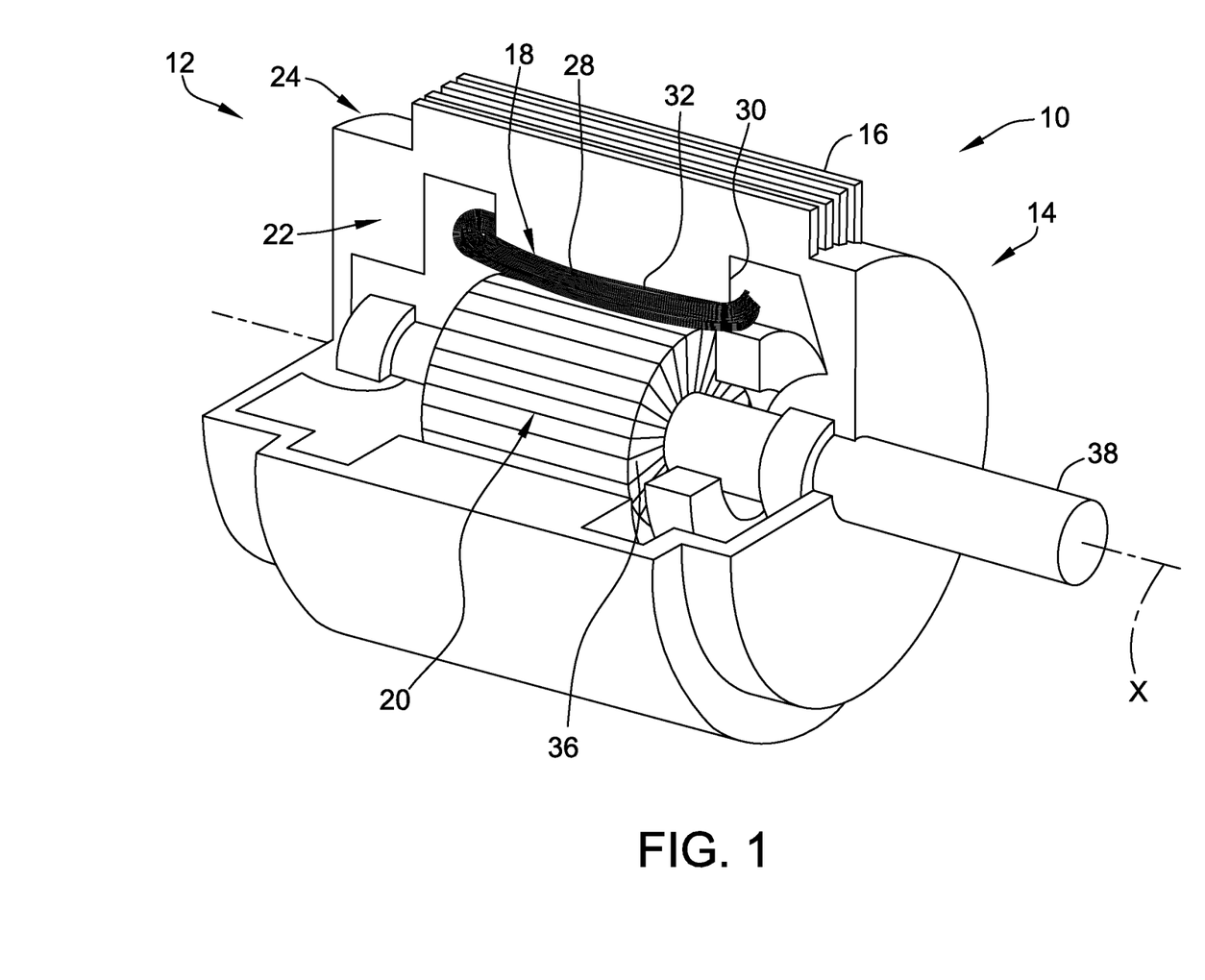
FIG. 1 is a perspective cut-away view of an exemplary electric machine.

FIG. 1 is a perspective cut-away view of an exemplary electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stator assembly 18 and a rotor assembly 20. Motor assembly housing 16 defines an interior 22 and an exterior 24 of motor 10 and is configured to at least partially enclose and protect stator assembly 18 and rotor assembly 20. Stator assembly includes a stator core 28, which includes a plurality of teeth 30 and a plurality of windings 32 wound around stator teeth 30. Furthermore, in an exemplary embodiment, stator assembly 18 is a three-phase salient pole stator assembly and stator core 28 is formed from a stack of laminations made of highly magnetically permeable material. Alternatively, stator assembly 18 is a single phase salient pole stator assembly. Stator assembly 18 may be a substantially round, segmented, or roll-up type stator construction and windings 32 are wound on stator core 28 in any suitable manner that enables motor 10 to function as described herein. For example, windings 32 may be concentrated type or overlapped type windings.

Rotor assembly 20 includes a permanent magnet rotor core 36 and a shaft 38. In the exemplary embodiment, rotor core 36 is formed from a stack of laminations made of magnetically permeable material. Rotor core 36 is substantially received in a central bore of stator core 28 for rotation along an axis of rotation X. FIG. 1 illustrates rotor core 36 and stator core 28 as solid for simplicity. While FIG. 1 is an illustration of a three phase electric motor, the methods and apparatus described herein may be included within motors having any number of phases, including single phase and multiple phase electric motors.

In the exemplary embodiment, electric motor 10 is coupled to a fan or centrifugal blower (not shown) for moving air through an air handling system, for blowing air over cooling coils, and/or for driving a compressor within an air conditioning/refrigeration system. More specifically, motor 10 may be used in air moving applications used in the heating, ventilation, and air conditioning (HVAC) industry, for example, in residential applications using ⅓ horsepower (hp) to 1 hp motors. Alternatively, motor 10 may be used in fluid pumping applications. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
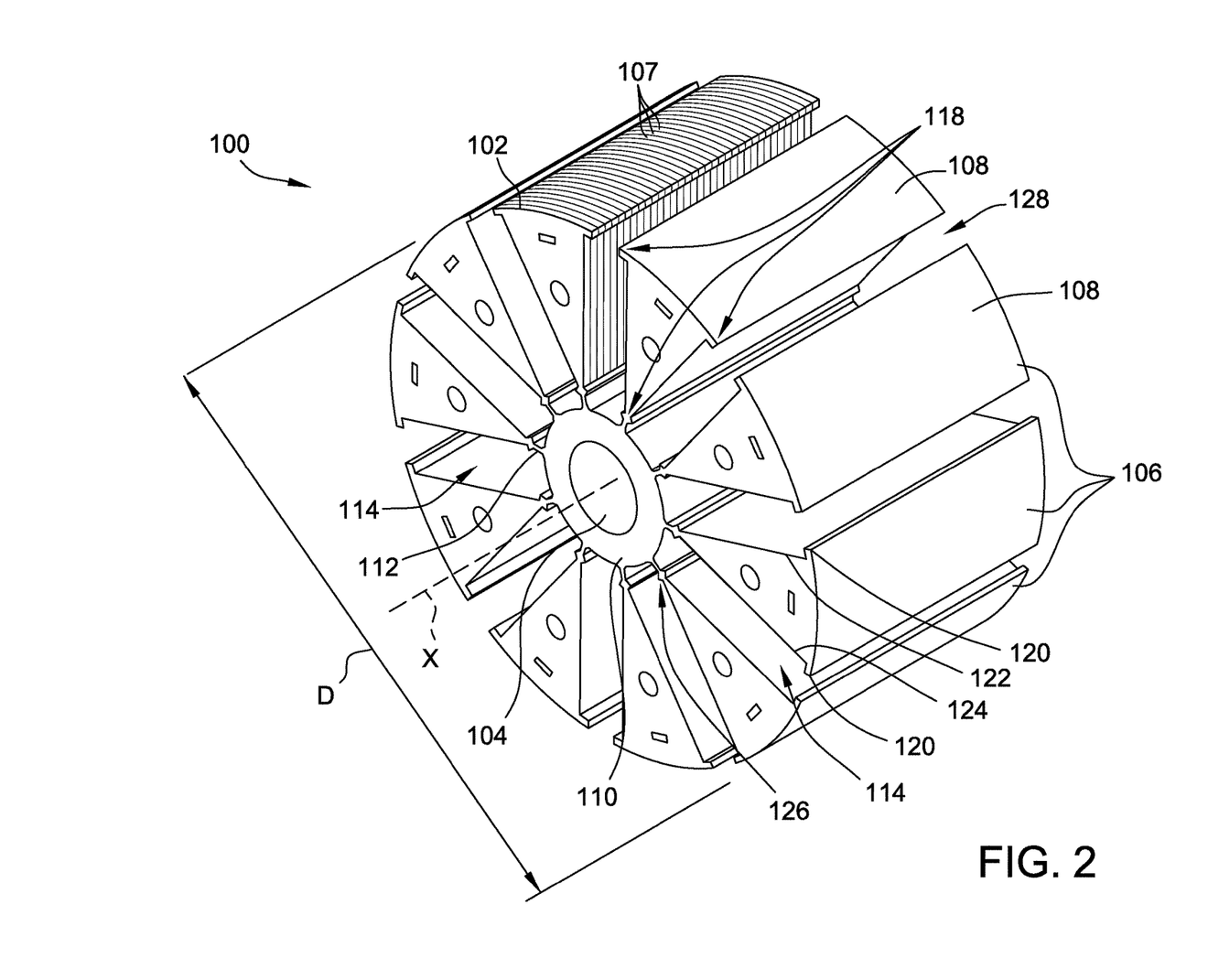
FIG. 2 is a perspective view of an exemplary rotor core that may be included within the electric machine shown in FIG. 1.
Figure 3:
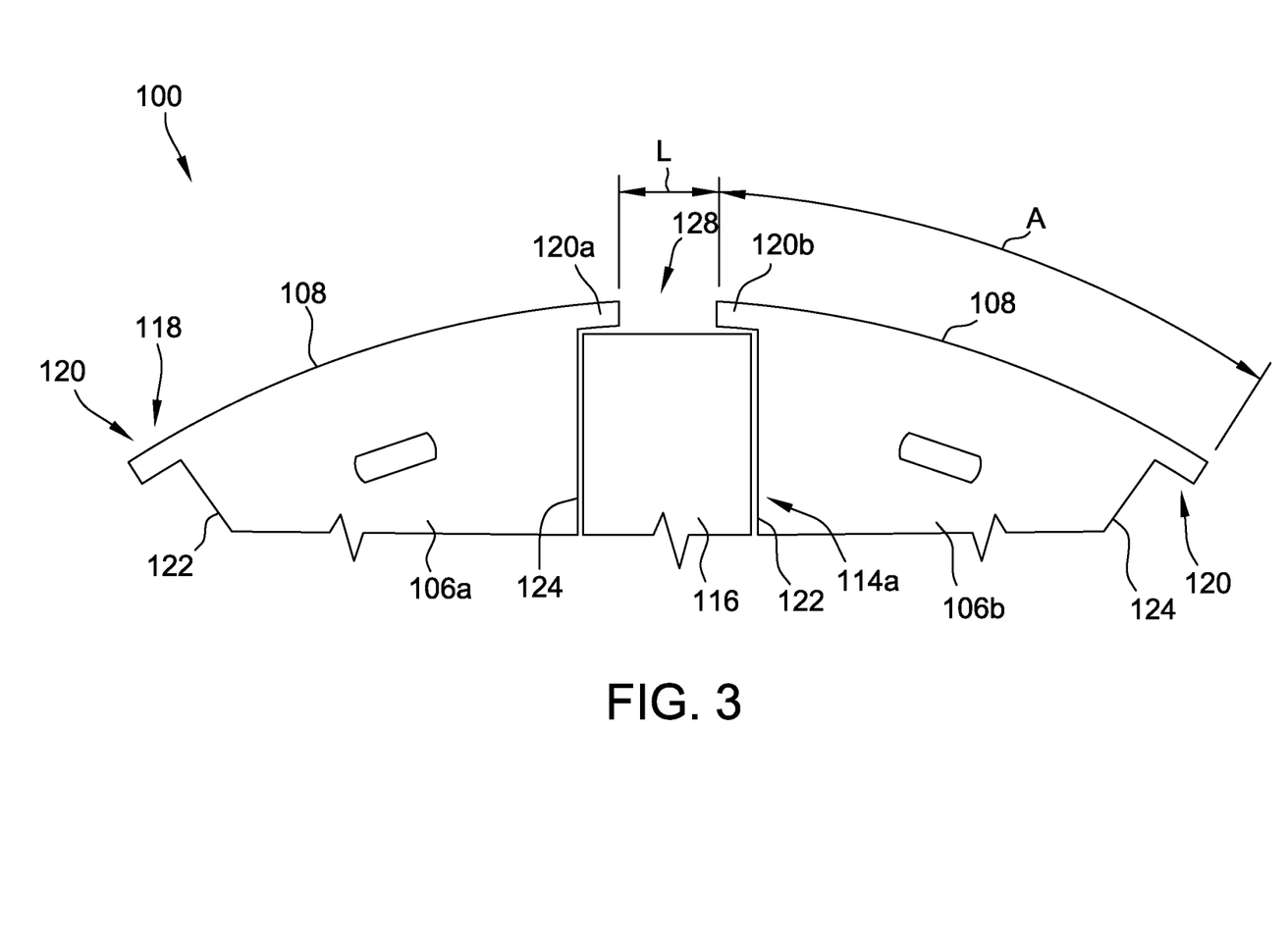
FIG. 3 is a front view of a portion of the rotor core shown in FIG. 2.

FIG. 2 is a perspective view of an exemplary rotor core 100 that may be included within the electric machine 10 shown in FIG. 1, and FIG. 3 is a front view of a portion of rotor core 100. In the exemplary embodiment, rotor assembly 20, also referred to as a radially embedded permanent magnet rotor, includes rotor core 100 and shaft 38. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and variable reluctance motors. Furthermore, rotor assembly 20 is driven by an electronic control (not shown), for example, a sinusoidal or trapezoidal electronic control.

Rotor core 100 is substantially cylindrical and includes an outer periphery 102 and a shaft central opening 104 having a diameter suitable for the diameter of shaft 38. Rotor core 100 and shaft 38 are concentric and are configured to rotate about axis of rotation X. In the exemplary embodiment, rotor core 100 includes a plurality of circumferentially-spaced rotor poles 106 each having an outer wall 108 along rotor outer periphery 102. Further, rotor core 100 includes a rotor diameter D defined between midpoints of outer walls 108 of opposing rotor poles 106. As used herein, the term "substantially cylindrical" is meant to describe that the rotor core includes a generally circular or oval cross-section, but is not required to be perfectly circular. For example, rotor core 100 may include one or more flattened or planar portions distributed about outer periphery 102, or outer walls 108 of rotor poles 106 may include a different radius than the overall rotor core 100 or even different radii between circumferential ends of each pole 106. Although described in relation to rotor core 100, the term "substantially cylindrical" applies to each rotor core of the disclosure.

As shown in FIG. 2, in the exemplary embodiment, each rotor pole 106 is coupled to a central hub 110 by a web 112. Hub 110 defines shaft opening 104. In other embodiments, less than all of rotor poles 106 may be coupled to hub 110. Furthermore, in the exemplary embodiment, rotor core 100, and therefore each rotor pole 106, is formed by a plurality of stacked laminations 107 that are interlocked. For example, laminations 107 are fabricated from multiple punched layers of stamped metal such as steel.

Furthermore, in the exemplary embodiment, rotor core 100 includes a plurality of radial apertures 114 alternately spaced with rotor poles 106. Each radial aperture 114 is configured to receive one or more permanent magnets 116 such that each magnet 116 is radially embedded in rotor core 100 and extends at least partially from rotor first end 12 to rotor second end 14. In the exemplary embodiment, radial apertures 114 are generally rectangular. Alternatively, radial apertures 114 may have any suitable shape corresponding to the shape of the permanent magnets that enables electric motor to function as described herein. In the exemplary embodiment, permanent magnets 116 are ceramic magnets magnetized in a direction tangent to axis of rotation X. However, magnet 116 may be fabricated from any suitable material that enables motor 10 to function as described herein, for example, bonded neodymium, AlNiCo, sintered neodymium, and/or samarium cobalt.

In the exemplary embodiment, the number of radial apertures 114 is equal to the number of rotor poles 106, and one magnet 116 is positioned within each radial aperture 114 between a pair of rotor poles 106. Although illustrated as including ten rotor poles 106, rotor core 100 may have any number of poles that allows motor 10 to function as described herein, for example, six, eight or twelve poles.

In the exemplary embodiment, each rotor pole 106 includes one or more permanent magnet retention member or protrusions 118. For example, a first pair of protrusions 120 is located proximate pole outer wall 108 along rotor outer edge 102 and extends into adjacent radial apertures 114 from circumferential end walls 122 and 124. Each protrusion 118 of the first pair of protrusions 120 is configured to facilitate retention of magnet 116 within radial aperture 114 by substantially preventing movement of magnet 116 in a radial direction towards outer edge 102. Further, a second pair of protrusions 126 is located proximate web 112 and extend adjacent radial apertures 114 from circumferential end walls 122 and 124. Each protrusion 118 of the second pair of protrusions 126 is configured to facilitate retention of magnet 116 within radial aperture 114 by substantially preventing movement of magnet 116 in a radial direction towards shaft 38. Alternatively, rotor core 100 may have any number and location of protrusions 118 that enable rotor core 110 to function as described herein.

Referring now to FIG. 3, a first pole 106a of plurality of poles 106 is positioned circumferentially adjacent a second pole 106b of plurality of poles 106 to define a first radial aperture 114a of plurality of radial apertures 114 therebetween that contains a permanent magnet 116. In the exemplary embodiment, first pole 106a includes a first protrusion 120a extending from end wall 124 into first radial aperture 114a. Similarly, second pole 106b includes a second protrusion 120b extending from end wall 122 into first radial aperture 114a such that a circumferential opening 128 is defined between first protrusion 120a and second protrusion 120b. In the exemplary embodiment, opening 128 extends a first length L of a ratio of between approximately 0.052 and approximately 0.058 of rotor diameter D. Specifically, in the exemplary embodiment, opening 128 extends a first length L of between approximately 0.16 inches and approximately 0.18 inches. More specifically, in the exemplary embodiment, opening 128 extends a first length L of 0.17 inches.

Furthermore, each rotor pole 106 includes an arc length A measured along outer wall 108. In the exemplary embodiment, arc length A extends between 0.801 inches and approximately 1.367 inches. In the exemplary embodiment, first length L of opening 128 is a ratio of between approximately 0.20 and approximately 0.28 of arc length A of second rotor pole 106b.

As shown in FIG. 3, outer walls 108 of first rotor pole 106a and second rotor pole 106b form at least a portion of first protrusion 120a and second protrusion 120b, respectively, such that first protrusion 120a and second protrusion 120b are circumferentially aligned.

In the exemplary embodiment, rotor core 100 is configured for use with one of a 42 frame electric motor, a 48 frame electric motor and a 56 frame electric motor. Generally, rotor core 100 may be used with any size or configuration of electric machine that facilitates operation as described herein.

Rotor core 100 having openings 128 as described herein minimize lowest common multiple order harmonic cogging torque. The lowest common multiple order is the first common multiple of number of stator slots & number of rotor poles. For 12 stator slots & 10 rotor poles this is 60. For 12 stator slots & 8 rotor poles the first common multiple will be 24th order.

Figure 4:
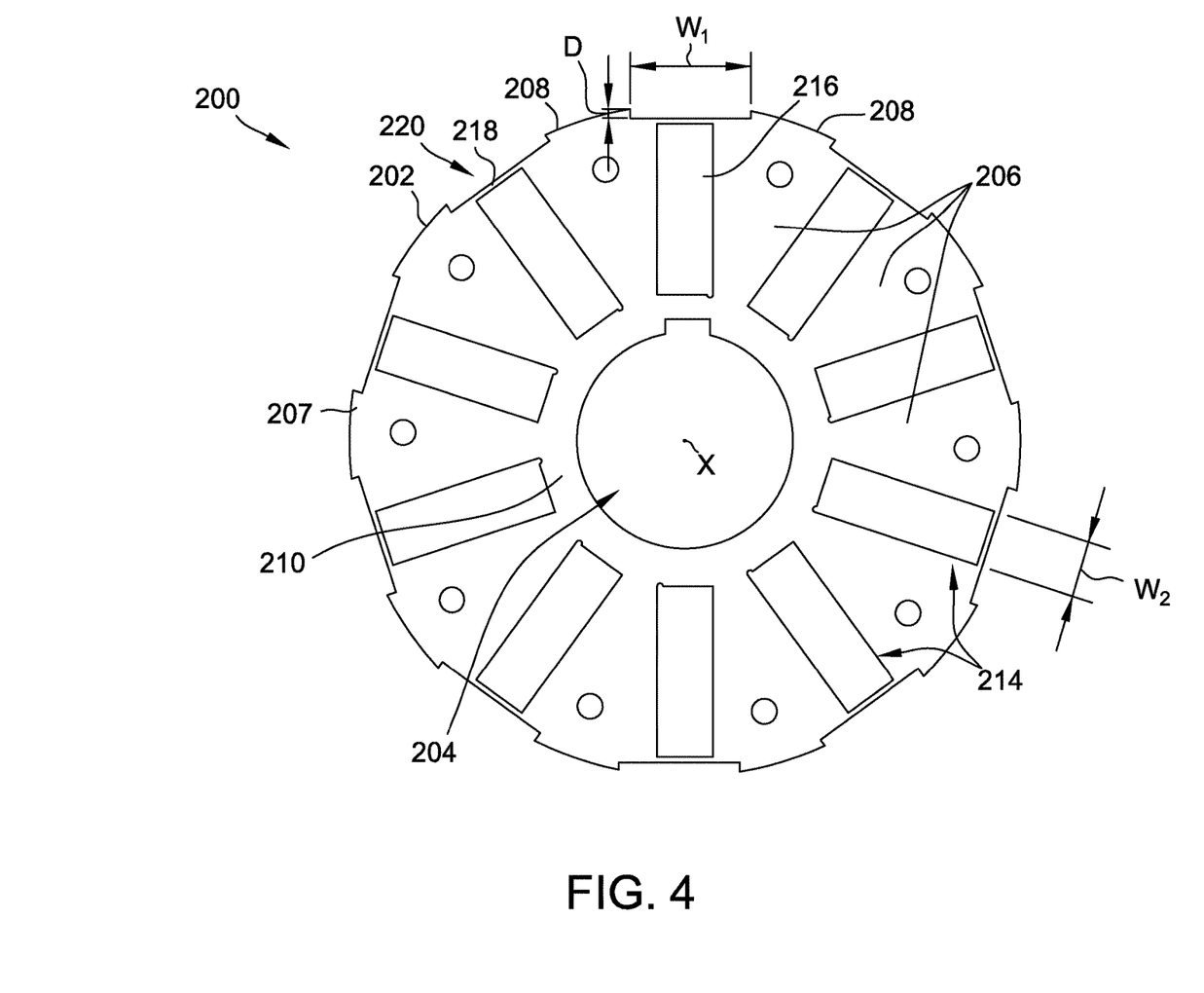
FIG. 4 is a front view of another exemplary rotor core that may be included within the electric machine shown in FIG. 1.

FIG. 4 is a front view of another exemplary rotor core 200 that may be included within electric machine 10 and positioned within stator core 28 (shown in FIG. 1). Rotor core 200 is substantially cylindrical and includes an outer periphery 202 and a shaft central opening 204 having a diameter corresponding to the diameter of shaft 38. Rotor core 200 and shaft 38 are concentric and are configured to rotate about axis of rotation X. In the exemplary embodiment, rotor core 200 includes a plurality of circumferentially-spaced rotor poles 206 each having an outer wall 208 along rotor outer periphery 202. As shown in FIG. 4, in the exemplary embodiment, each rotor pole 206 is coupled to a central hub 210 that defines shaft opening 204. In other embodiments, less than all of rotor poles 206 may be coupled to hub 210. Furthermore, in the exemplary embodiment, rotor core 200, and therefore each rotor pole 206, is formed by a plurality of stacked laminations 207 that are interlocked. For example, laminations 207 are fabricated from multiple punched layers of stamped metal such as steel.

Furthermore, in the exemplary embodiment, rotor core 200 includes a plurality of radial apertures 214 alternately spaced with rotor poles 206. Each radial aperture 214 is configured to receive one or more permanent magnets 216 such that each magnet 216 is radially embedded in rotor core 200 and extends at least partially from rotor first end 12 to rotor second end 14. In the exemplary embodiment, radial apertures 214 are generally rectangular. Alternatively, radial apertures 214 may have any suitable shape corresponding to the shape of the permanent magnets that enables electric motor to function as described herein. In the exemplary embodiment, permanent magnets 216 are ceramic magnets magnetized in a direction tangent to axis of rotation X. However, magnet 216 may be fabricated from any suitable material that enables motor 10 to function as described herein, for example, bonded neodymium, AlNiCo, sintered neodymium, and/or samarium cobalt.

In the exemplary embodiment, the number of radial apertures 214 is equal to the number of rotor poles 206, and one magnet 216 is positioned within each radial aperture 214 between a pair of rotor poles 206. Although illustrated as including ten rotor poles 206, rotor core 200 may have any number of poles that allows motor 10 to function as described herein, for example, six, eight or twelve poles.

In the exemplary embodiment, rotor core 200 also includes a plurality of bridges 218 that extend across radial apertures 214 and between adjacent rotor poles 206. Bridges 218 provide rotor 200 with a robust structure that prevents or reduces movement of rotor poles 206 with respect to each other. Such rotor core rigidity reduces the cogging torque with rotor core 200. Furthermore, bridges 218 are configured to facilitate retention of magnet 216 within radial apertures 214 by substantially preventing movement of magnet 216 in a radial direction towards outer periphery 202.

As shown in FIG. 4, rotor core 200 also includes a plurality of dummy slots 220 formed in outer periphery 202 of rotor core 200. Specifically, dummy slots 220 are formed in outer walls 208 and are positioned between adjacent rotor poles 206 such that each dummy slot 220 is radially aligned with a radial aperture 214. In the exemplary embodiment, each dummy slot includes a width W sized and shaped to minimize cogging torque of electric machine 10. Specifically, in the exemplary embodiment, width W1 of dummy slot is approximately twice a width W2 of each radial aperture 214. In another embodiment, width W1 of dummy slot is between approximately 8% and approximately 12% the width W2 of each radial aperture 214.

Moreover, each dummy slot 220 also includes a radial depth D that is based on at least one of a size of permanent magnet 216, a diameter of rotor core 200, a distance between rotor poles 206 and stator core 28, and a number of rotor poles 206 in rotor core 200. Specifically, each dummy slot 220 comprises a radial depth D of between approximately 0.5 mm and approximately 3.0 mm.

Dummy slots 220 operate in much the same way as openings 128 of rotor core 100 with respect to reducing cogging torque during operation of electric machine 10. Bridges 218 over magnets 216 between poles 206 offer additional rotor mechanical strength for high speed, high vibration or for manufacturing reasons with the advantage of being able to tailor the rotor geometry to cancel out the cogging torque harmonics to reduce or eliminate cogging torque induced acoustic noise.

Figure 5:
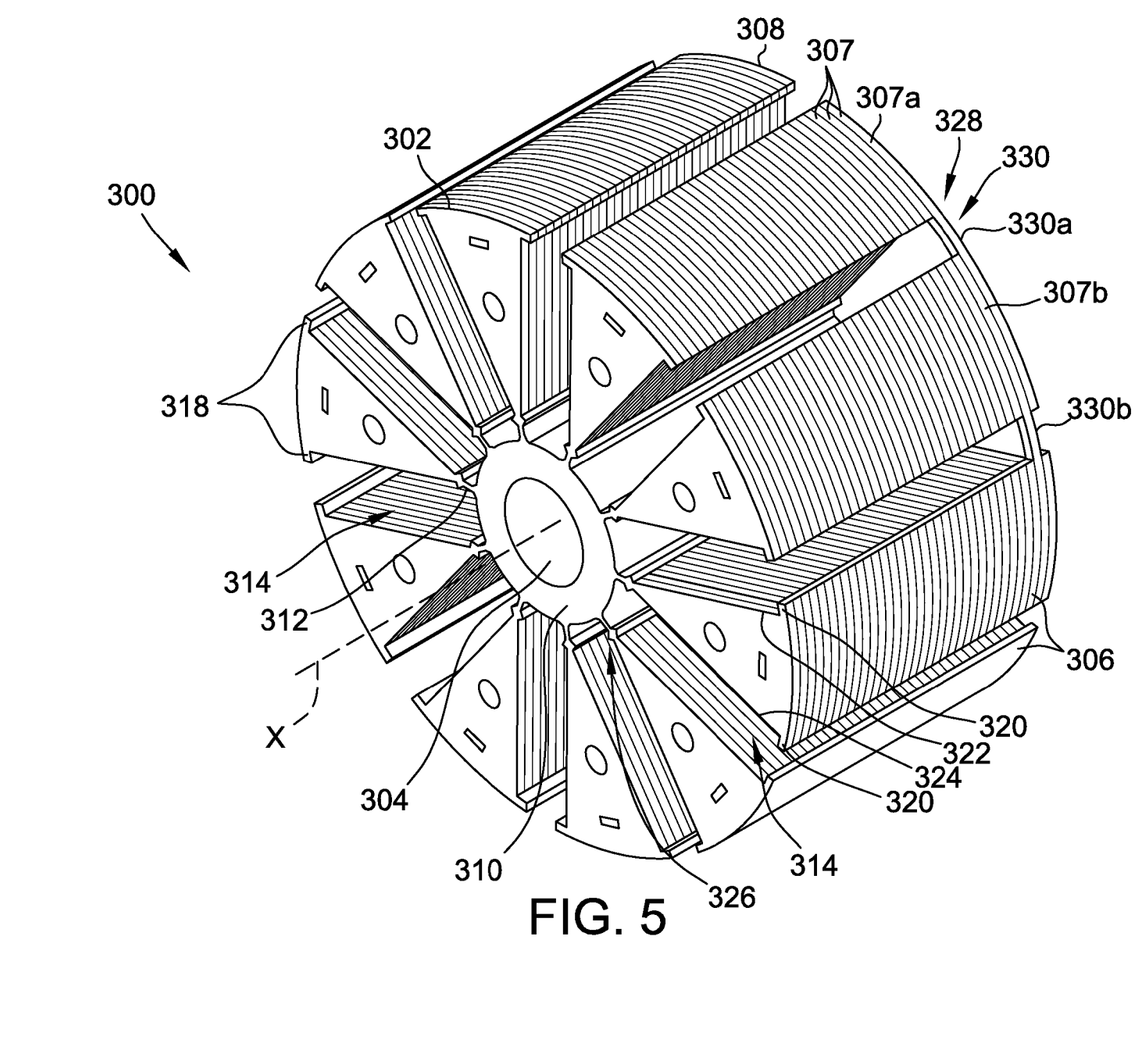
FIG. 5 is a perspective view of yet another exemplary rotor core that may be included within the electric machine shown in FIG. 1.
Figure 6:
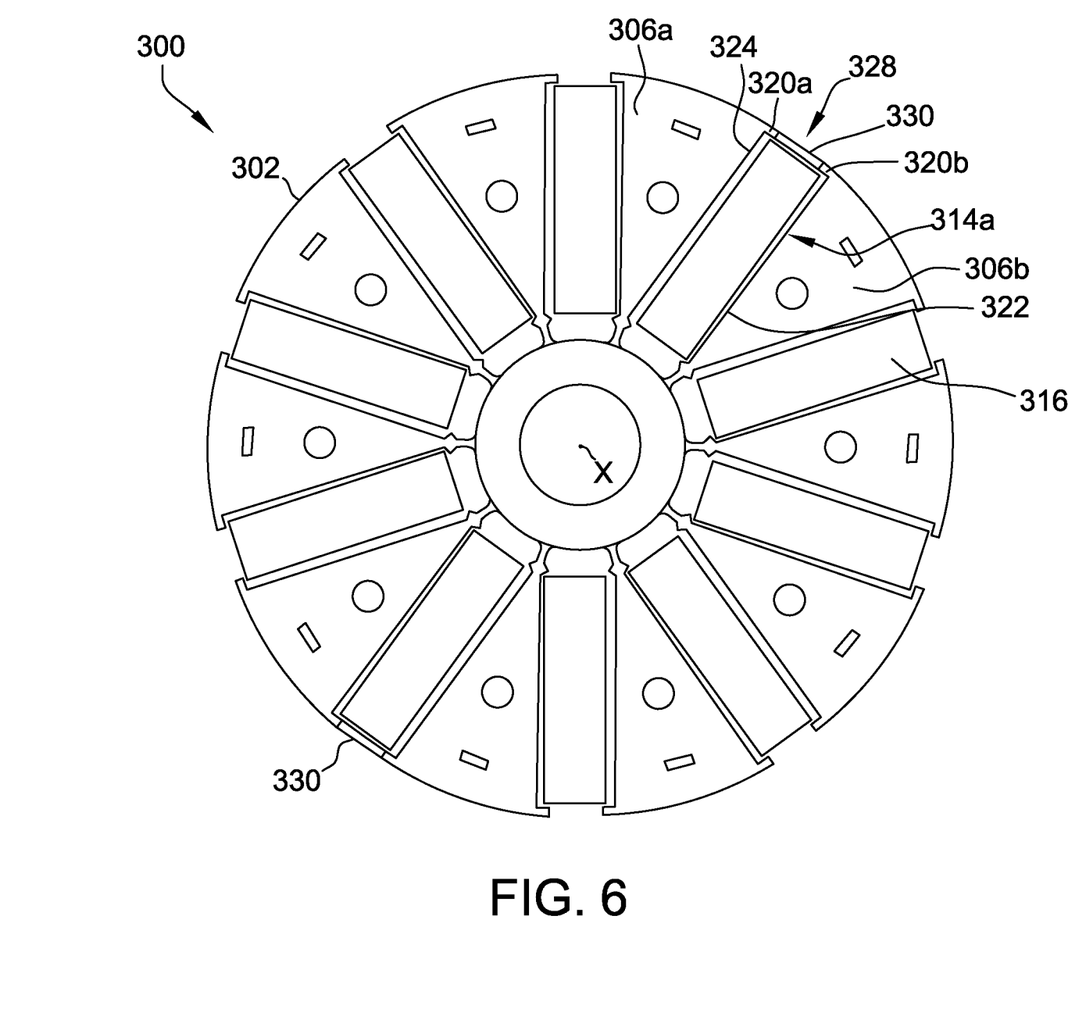
FIG. 6 is a front view of the rotor core shown in FIG. 7.

FIG. 5 is a perspective view of yet another exemplary rotor core 300 that may be included within electric machine 10 (shown in FIG. 1). FIG. 6 is a front view of rotor core 300. Rotor core 300 is substantially cylindrical and includes an outer periphery 302 and a shaft central opening 304 having a diameter corresponding to the diameter of shaft 38. Rotor core 300 and shaft 38 are concentric and are configured to rotate about axis of rotation X. In the exemplary embodiment, rotor core 300 includes a plurality of circumferentially-spaced rotor poles 306 each having an outer wall 308 along rotor outer periphery 302. As shown in FIG. 5, in the exemplary embodiment, each rotor pole 306 is coupled to a central hub 310 by a web 312. Hub 310 defines shaft opening 304. In other embodiments, less than all of rotor poles 306 may be coupled to hub 310. Furthermore, in the exemplary embodiment, rotor core 300, and therefore each rotor pole 306, is formed by a plurality of stacked laminations 307 that are interlocked or otherwise joined together. For example, laminations 307 are fabricated from multiple punched layers of stamped metal such as steel.

Furthermore, in the exemplary embodiment, each lamination 307 of rotor core 300 includes a plurality of radial apertures 314 alternately spaced with rotor poles 306 each lamination 307. Each radial aperture 314 is configured to receive one or more permanent magnets 316 such that each magnet 316 is radially embedded in rotor core 300 and extends at least partially from rotor first end 12 to rotor second end 14. In the exemplary embodiment, radial apertures 314 are generally rectangular. Alternatively, radial apertures 314 may have any suitable shape corresponding to the shape of the permanent magnets that enables electric motor to function as described herein. In the exemplary embodiment, permanent magnets 316 are ceramic magnets magnetized in a direction tangent to axis of rotation X. However, magnet 316 may be fabricated from any suitable material that enables motor 10 to function as described herein, for example, bonded neodymium, sintered neodymium, and/or samarium cobalt.

In the exemplary embodiment, the number of radial apertures 314 is equal to the number of rotor poles 306 in each lamination 307, and one magnet 316 is positioned within each radial aperture 314 between a pair of rotor poles 306. Although each lamination 307 is illustrated as including ten rotor poles 306, rotor core 300 may have any number of poles that allows motor 10 to function as described herein, for example, six, eight or twelve poles.

In the exemplary embodiment, each rotor pole 306 of each lamination 307 includes one or more permanent magnet retention members or protrusions 318. For example, for each lamination 307, a first pair of protrusions 320 is located proximate pole outer wall 308 along rotor outer edge 302 and extends into adjacent radial apertures 314 from circumferential end walls 322 and 324. Each protrusion 318 of the first pair of protrusions 320 is configured to facilitate retention of magnet 316 within radial aperture 314 by substantially preventing movement of magnet 316 in a radial direction towards outer edge 302. Further, for each lamination 307, a second pair of protrusions 326 is located proximate to web 312 and extend adjacent radial apertures 314 from circumferential end walls 322 and 324. Each protrusion 318 of the second pair of protrusions 326 is configured to facilitate retention of magnet 316 within radial aperture 314 by substantially preventing movement of magnet 316 in a radial direction towards shaft 38. Alternatively, rotor core 300 may have any number and location of protrusions 318 that enable rotor core 310 to function as described herein.

Referring now to FIG. 6, illustrating an exemplary lamination 107, a first pole 306a of plurality of poles 306 is positioned circumferentially adjacent a second pole 306b of plurality of poles 306 to define a first radial aperture 314a of plurality of radial apertures 314 therebetween that contains a permanent magnet 316. In the exemplary embodiment, first pole 306a includes a first protrusion 320a extending from end wall 324 into first radial aperture 314a. Similarly, second pole 306b includes a second protrusion 320b extending from end wall 322 into first radial aperture 314a such that a circumferential opening 328 is defined between first protrusion 320a and second protrusion 320b. As such, each lamination 107 includes a plurality of circumferentially-spaced openings 328 defined between protrusions 320 of adjacent rotor poles 306 that extend into a shared radial aperture 314 of the plurality of radial apertures 314.

In the exemplary embodiment, a bridge member 330 is positioned within at least one opening 328 in each lamination 107. As described herein, when each lamination is rotated by a predetermined angle with respect to a preceding lamination 107, bridge members 330 rotate circumferentially about rotor core 300. In the exemplary embodiment, the predetermined angle is one of 360/n or (360×2)/(n), where n is the number of rotor poles 306 in each lamination 307. For example, rotor core 300 includes ten rotor poles 306. As such, in one embodiment, a second lamination 307b is rotated 36 degrees about axis X with respect to an adjacent first lamination 307a. In such a configuration, a first bridge member 330a in the first lamination 307a is circumferentially offset from a second bridge member 330b in the second lamination 307b. More specifically, first bridge member 330a in the first lamination 307a is circumferentially offset from second bridge member 330b in the second lamination 307b by a distance of one rotor pole 306. That is, when adjacent laminations 307 are rotated 360/n degrees, laminations 307 are said to be indexed by one rotor pole 306 or one radial aperture 314.

Similarly, in embodiments where adjacent aminations 307 are rotated (360×2)/(n) degrees, second lamination 307b is rotated 72 degrees about axis X with respect to an adjacent first lamination 307a. In such a configuration, first bridge member 330a in the first lamination 307a is circumferentially offset from second bridge member 330b in the second lamination 307b. More specifically, first bridge member 330a in the first lamination 307a is circumferentially offset from second bridge member 330b in the second lamination 307b by a distance of two rotor poles 306. That is, when adjacent laminations 307 are rotated (360×2)/(n) degrees, laminations 307 are said to be indexed by two rotor poles 306 or two radial apertures 314.

In other embodiments, as shown in FIG. 6, for example, each lamination 307 includes a pair of bridge members 330 oriented 180 degrees apart from one another. Similarly, in yet another embodiment, each lamination 307 includes a bridge member 330 positioned within every other opening 328 about outer periphery 302. In configurations where rotor core 300 includes ten rotor poles 306 and each lamination 307 includes a single bridge member 330, bridge members 330 are circumferentially aligned every eleventh lamination 307. In configurations where rotor core 300 includes ten rotor poles 306 and each lamination 307 includes two opposing bridge members 330, bridge members 330 are circumferentially aligned every sixth lamination 307. In configurations where rotor core 300 includes ten rotor poles 306 and each lamination 307 includes a bridge member 330 in every other opening 328, bridge members 330 are circumferentially aligned every other lamination 308. Generally, bridge members 330 are aligned every other lamination, every n/2+1 laminations, or every n+1 laminations, where n is the number of rotor poles 306 in each lamination 307

In the exemplary embodiment, bridge members 330 operate similarly to bridges 218 (shown in FIG. 4) to provide a robust rotor structure that retains rotor poles 306 in place to prevent or reduce pole distortion or movement during high speed, high vibration operation or during manufacturing. While leaving a majority of openings 328 open operates similarly to openings 128 to minimize pole leakage and reduce cogging torque during operation of electric machine 10. Generally, the more bridge members 330 included in rotor core 300, the more robust the structure of rotor core 300 and the less movement of rotor poles 306 relative to each other.

Described herein are exemplary systems and apparatus that reduce cogging torque and reduce movement of rotor poles with respect to one another. The systems and apparatus described herein may be used in any suitable application. However, they are particularly suited for HVAC and pump applications.

Exemplary embodiments of rotor cores for electric machines are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A permanent magnet rotor core for use in an electric motor that includes a stator core, said permanent magnet rotor core comprising:
   an outer periphery;
   a plurality of rotor poles circumferentially-spaced about a central axis, wherein each of said plurality of rotor poles comprise an outer wall along the outer periphery;
   a plurality of radial apertures alternately-spaced with said plurality of rotor poles, wherein each radial aperture is configured to receive at least one permanent magnet therein;
   a plurality of bridges, wherein each bridge extends across a radial aperture of said plurality of radial apertures and between adjacent rotor poles of said plurality of rotor poles, and retains the at least one permanent magnet within said radial aperture of the plurality of radial apertures; and
   a plurality of dummy slots formed in said outer periphery of said rotor core, wherein each dummy slot is formed in the outer walls, positioned between adjacent rotor poles of said plurality of rotor poles, and has a radial depth based on at least one of a size of the permanent magnet, a diameter of the rotor core, a distance between rotor poles and the stator core, and a number of rotor poles, wherein the radial depth is between approximately 0.5 mm and approximately 3.0 mm.

2. The permanent magnet rotor core of claim 1, wherein each dummy slot of said plurality of dummy slots is radially aligned with a radial aperture of said plurality of radial apertures.

3. The permanent magnet rotor core of claim 1, wherein each dummy slot of said plurality of dummy slots comprises a width of approximately twice a width of said radial aperture.

4. The permanent magnet rotor core of claim 1, wherein each dummy slot of said plurality of dummy slots comprises a width of between approximately 8% and approximately 12% a width of said radial aperture.

5. The permanent magnet rotor core of claim 1, wherein each dummy slot of said plurality of dummy slots comprises a width that is based on a shape of a stator tooth of the stator core.

\* \* \* \* \*